Figure 1:
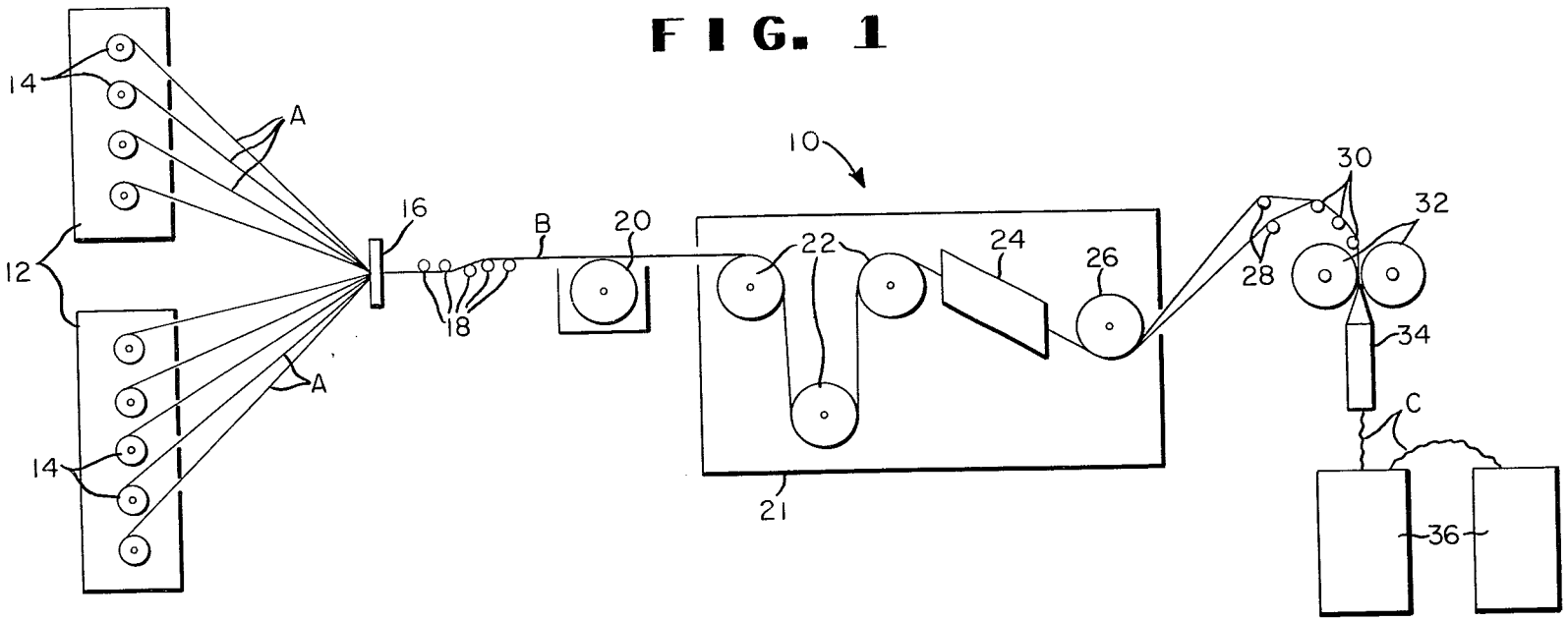
Figure 2:
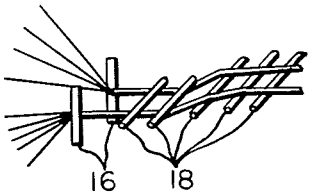

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 1, 1975

936 O.G. 8

T936,005

HIGH TENACITY CRIMPED TOW AND PROCESS

Ronald Royce Kramer, 6 Oxford Crescent, P.O. Box 22, Amherstview, Ontario, Canada Continuation of application Ser. No. 306,920, Nov. 15, 1972. This application Sept. 4, 1974, Ser. No. 503,113
Claims priority, application Canada, Jan. 18, 1972, 132,731
Int. Cl. D02g *1/12*
U.S. Cl. 28—72.14
1 Sheet Drawing. 7 Pages Specification

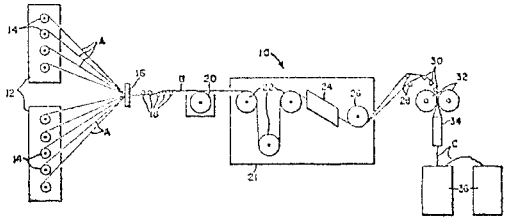

A process is disclosed for producing a drawn, crimped tow (for staple) having increased tenacity by: combining a multiplicity of ends of drawn high tenacity industrial yarn of a synthetic polymeric material to form a tow, heating and plasticizing the tow and crimping the tow so plasticized.

HIGH TENACITY CRIMPED TOW AND PROCESS

Original Filed Nov. 15, 1972